(No Model.)

F. FARRAR.
CARRIER FOR GRAPPLES.

No. 489,226. Patented Jan. 3, 1893.

UNITED STATES PATENT OFFICE.

FRED FARRAR, OF BANGOR, MAINE.

CARRIER FOR GRAPPLES.

SPECIFICATION forming part of Letters Patent No. 489,226, dated January 3, 1893.

Application filed May 5, 1892. Serial No. 431,873. (No model.)

*To all whom it may concern:*

Be it known that I, FRED FARRAR, a citizen of the United States, residing at Bangor, in the county of Penobscot and State of Maine, have invented certain new and useful Improvements in Lifters and Carriers for the Grapples of Horse Hay-Forks; and I do hereby declare the following to be a full, clear, and exact description of the invention, such as will enable others skilled in the art to which it appertains to make and use the same.

Figure 1:
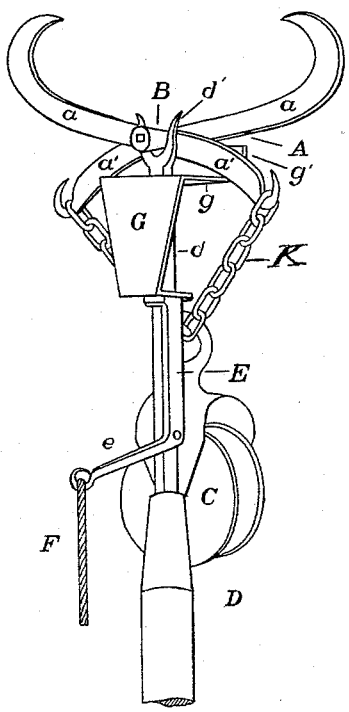
Figure 2:
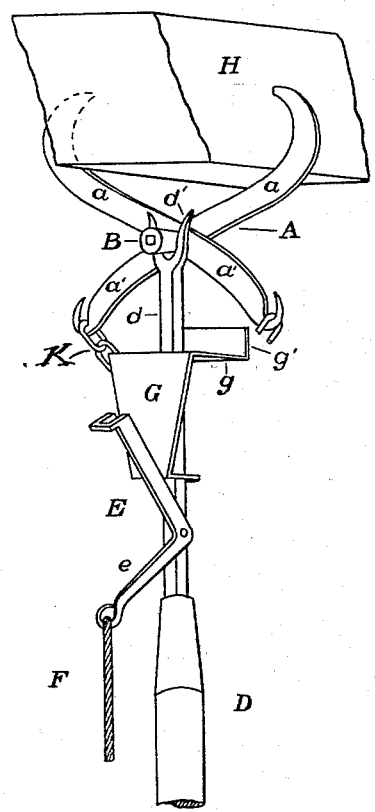

My invention consists of an improved grapple lifter and carrier for horse hay forks, and is fully illustrated in the accompanying drawings in which Figure 1 is a perspective view showing grapple opened and sustained by the lifter while location of grapple is being changed. Fig. 2 is a perspective view showing grapple fixed to rafter (sheave and part of chain omitted).

Similar letters refer to corresponding parts throughout the figures.

The claw grapple, commonly used with horse hay forks, operates on the familiar principle exhibited in the common ice tongs. It is ordinarily clutched to a beam or rafter near the top of the barn, and is reached by means of a ladder and shifted from place to place by hand as occasion requires. By my device it is handled from the barn floor and quickly and easily shifted and adjusted as required, without the use of ladders or handling from above.

I provide the ordinary grapple A with sheave C and chain K as commonly used, with this addition that the head of the bolt upon which the jaws $a\ a$ of the grapple are pivoted is extended outward to form a projecting knob B preferably in the form of a truncated cone as shown with the base outward. The object of the outwardly projecting knob is to provide a means of engaging the lifter D with the grapple A.

The lifter D consists of a long straight shank or handle $d$ terminating at its upper end in a fork $d'$. A trip E is pivoted to the shank $d$ and is provided with a lever arm $e$ to which is attached a cord F by which the trip is operated. Upon the shank $d$ is fitted the rest G sliding freely on said shank between the fork $d'$ and the point on the shank where the trip E is pivoted and having a seat $g$ and a back $g'$ to receive and support the arms of the grapple A.

The lifter D is adjusted for operation as follows; the rest G is slid upward upon the shank $d$ until further motion is prevented by the spread of the fork $d'$. The trip E is then turned on its pivot into the position shown in Fig. 1, and the rest G is thus prevented from returning or falling back. The lifter being raised as shown in Fig. 1 the seat $g$ of the rest G is then introduced between the handles $a'\ a'$ of the grapple A and the jaws $a\ a$ of the grapple A are spread open by the pressure of the seat $g$ upon the handles accompanying the thrust of the lifter and continue to open until the knob B of the grapple rests in the fork $d'$. The part $g'$ prevents the grapple from tipping backward. The whole grapple and connections are then carried on the lifter to the point where it is desired to fix the grapple to the beam H, and is held in such position that when the jaws of the grapple close their points may catch into the sides of the beam; the cord F is pulled and the trip E thereby turned back and away from under the rest G, when, the rest G instantly falling, the jaws of the grapple actuated by the weight of the sheave C and chain K close instantly, and pricking into the beam, the whole grapple is suspended and ready for use.

Any convenient form of trip may be substituted for that shown in the drawings.

The ordinary grapple can easily be adapted for use with my lifter by simply substituting for the common pivot a pivot having an outwardly projecting head, or a round bolt with an outwardly projecting head and an inwardly projecting screw-threaded point upon which a nut may be screwed down to hold the parts together.

Having thus described my invention, what I claim and desire to secure by Letters Patent is

1. A lifter for the grapples of horse hay forks, consisting of a shank or handle having a fork at its upper end, a trip on said shank and means of operating said trip, and a rest so sliding on said shank between said fork and said trip as to be supported in position and released therefrom by the operation of said trip, and having a seat shaped and adapted to be inserted between the handles of a grapple when said rest is in position and secured by said trip, and force the jaws of such grapple open with a thrust of the lifter.

2. The combination of a grapple having a pivot with an outwardly projecting knob; and a lifter consisting of a shank or handle having a fork at its upper end, a trip on said shank and means of operating said trip, and a rest so sliding on said shank between said fork and said trip as to be supported in position and released therefrom by the operation of said trip, and having a seat shaped and adapted to be inserted between the handles of a grapple when said rest is in position and secured by said trip, and force the jaws of such grapple open with a thrust of the lifter.

3. In the herein described lifter for the grapples of horse hay forks, the combination of the shank $d$ having fork $d'$; trip E pivoted to said shank; cord F; and sliding rest G with seat $g$ and back $g'$.

4. The combination of a grapple having a pivot with an outwardly flaring projecting knob; and a lifter consisting of a shank or handle having a fork at its upper end, a trip on said shank, and means of operating said trip, and a rest so sliding on said shank between said fork and said trip as to be supported in position and released therefrom by the operation of said trip, and having a seat shaped and adapted to be inserted between the handles of a grapple when said rest is in position and secured by said trip, and force the jaws of such grapple open with a thrust of the lifter.

FRED FARRAR.

Witnesses:
  F. H. CLERGUE,
  F. M. LAUGHTON.